United States Patent
Tomazic (12)

(10) Patent No.: US 6,455,187 B1
(45) Date of Patent: Sep. 24, 2002

(54) RECOMBINATOR FOR THE RE-ACIDIFICATION OF AN ELECTROLYTE STREAM IN A FLOWING ELECTROLYTE ZINC-BROMINE BATTERY

(75) Inventor: Gerd Tomazic, Murzzuschlag (AT)

(73) Assignee: Premium Power Acquisition Corporation, Norwood, MA (US)

( * ) Notice: Subject to any disclaimer, the term of this patent is extended or adjusted under 35 U.S.C. 154(b) by 0 days.

(21) Appl. No.: 09/677,996

(22) Filed: Oct. 3, 2000

(51) Int. Cl.⁷ ................................................. H01M 2/36
(52) U.S. Cl. ......................... 429/72; 429/101; 429/105
(58) Field of Search .................................. 429/101, 105, 429/72

(56) References Cited

U.S. PATENT DOCUMENTS 4,144,381 A    3/1979  Fatica
4,343,868 A *  8/1982  Putt ............................. 429/17
4,540,639 A *  9/1985  Grimes ........................ 429/17

* cited by examiner

Primary Examiner—Carol Chaney
Assistant Examiner—Dah-Wei Yuan
(74) Attorney, Agent, or Firm—Factor & Partners

(57) ABSTRACT

A recombinator device and associated method for re-acidification of an electrolyte in a flowing electrolyte zinc-bromine battery. The recombinator device receives hydrogen, formed as a result of electrolysis within cell stacks of the zinc-bromine battery, as well as aqueous bromine from the zinc-bromine battery. Upon receipt, the hydrogen and bromine are introduced into a reaction chamber in the recombinator device so as to form hydrobromic acid. The hydrobromic acid is then reintroduced back into the electrolyte of the zinc-bromine battery for re-acidification of same.

21 Claims, 1 Drawing Sheet

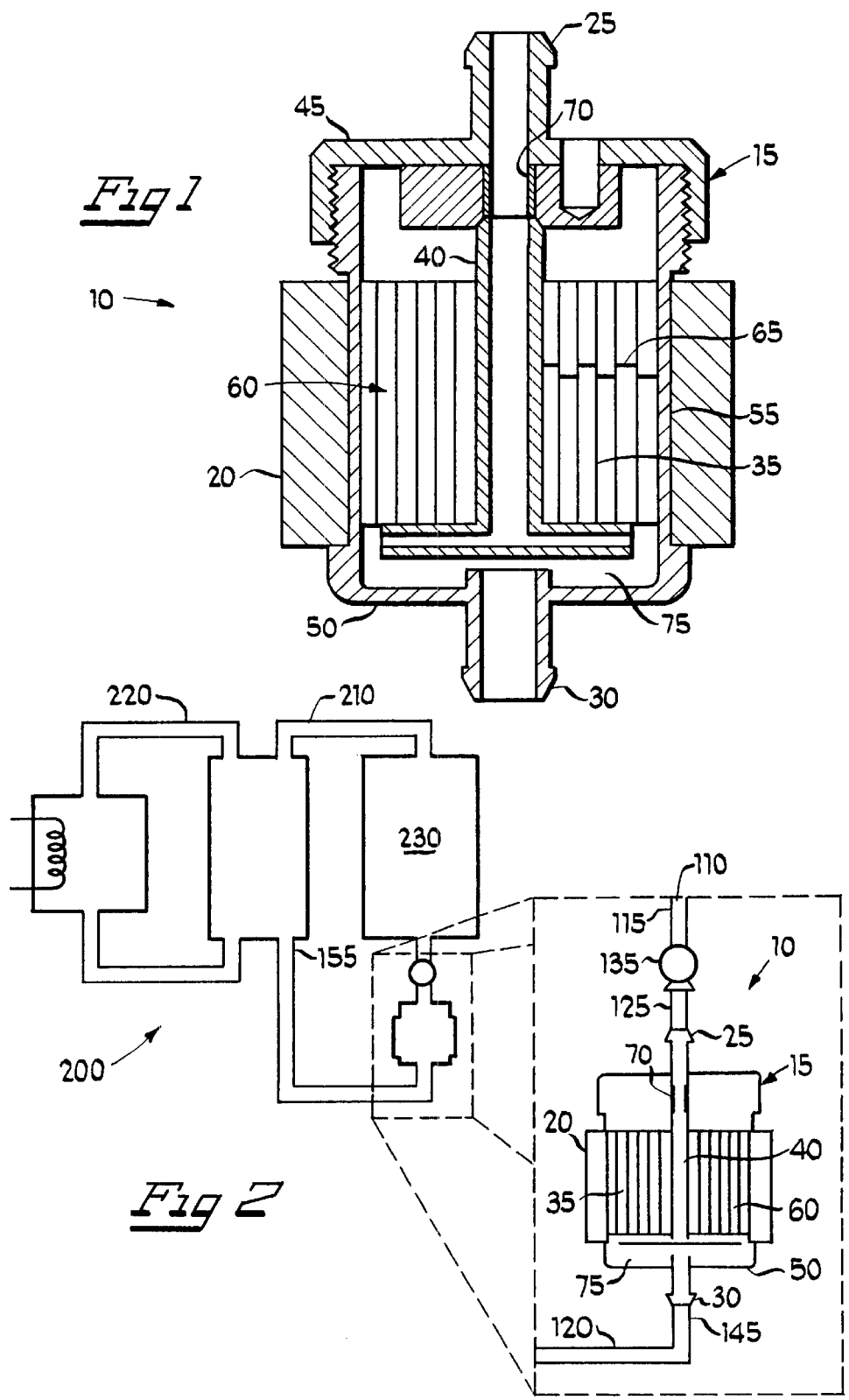

RECOMBINATOR FOR THE RE-ACIDIFICATION OF AN ELECTROLYTE STREAM IN A FLOWING ELECTROLYTE ZINC-BROMINE BATTERY

BACKGROUND OF THE INVENTION

1. Field of the Invention

The present invention relates in general to zinc-bromine battery systems, and, more particularly, to a device and method for the re-acidification of an electrolyte stream in a zinc-bromine flowing electrolyte battery.

2. Background Art

The original concept of utilizing the properties of zinc and bromine in a battery system was patented over 100 years ago in U.S. Pat. No. 312,802. Generally, the battery system has a negative flow loop and a positive flow loop, as well as a separator of some kind in-between. The zinc-bromine electrolyte is circulated through both loops, depositing zinc at the negative electrode, and creating aqueous bromine at the positive electrode, all while creating a voltage difference between the two electrodes. The zinc is collected as a solid, while the aqueous bromine forms a second liquid phase and is separated from the flowing electrolyte.

Utilizing a circulating electrolyte system, Zinc-Bromine batteries have significant advantages, including ease of thermal management and uniformity of reactant due to electrolyte flow, operation of the system at ambient temperature, rapid system charging, complete system discharging, good specific energy of reactants, and a system that is generally constructed from low-cost and readily available materials. The system did not gain immediate commercial acceptance, however, due to the formation of zinc dendrites upon deposition of zinc at the negative electrode, impeding the flow of electrolyte, and due to the solubility of bromine in the zinc-bromine electrolyte, causing a cell short circuit.

In the 1970s, Exxon Corp. and Gould Inc. developed techniques that attempted to inhibit the formation of zinc dendrites upon deposition at the negative electrode. Upon operation, the cell could now be operated for significantly longer periods of time without the previous inhibited flow. The zinc-bromine battery was now a commercially reasonable means of storing and recovering power. However, current operation of zinc-bromine batteries still contain significant problems.

Current operation of a zinc-bromine cell requires specific parameters for continuous operation. Among these requirements is one that the system be operated at or near a pH of two. This requirement exists because at higher pH levels mossy zinc plating develops, as well as bromates within the electrolyte solution. Alternatively, at lower pH values, zinc corrodes at an increasing rate. Although the system reactions do not themselves affect pH, overcharging of the cell during cyclical operation may electrolyze water, creating gaseous hydrogen and hydroxide ions in the water, raising the pH.

Therefore, it is an object of this invention to create a device and method for the re-acidification of the zinc-bromine electrolyte stream in a flowing electrolyte system to, in turn, facilitate longer and more efficient continuous operation of the battery.

It is a further object of this invention to create a means for re-acidification utilizing the products of the current battery system so that an ongoing and steady-state system may be developed.

SUMMARY OF THE INVENTION

The present invention is directed to a recombinator device for the re-acidification of an electrolyte stream in a flowing electrolyte zinc-bromine battery. The recombinator device comprises a housing operatively associated with a zinc-bromine battery, means for receiving hydrogen and bromine from the zinc-bromine battery, means for reacting the hydrogen and bromine together so as to form hydrobromic acid, and means for distributing the hydrobromic acid into an electrolyte stream or electrolyte reservoir of the zinc-bromine battery for re-acidification of same.

In a preferred embodiment of the invention, the hydrogen and the bromine receiving means comprises an inlet stream coupling operatively attached to the zinc-bromone battery. In such a preferred embodiment, the hydrobromic distribution means comprises an outlet stream coupling operatively attached to at least one of an electrolyte stream or electrolyte reservoir of the zinc-bromine battery.

In yet another preferred embodiment, the reaction means includes a reaction chamber. In this preferred embodiment, the recombinator device further includes means for facilitating the reaction of hydrogen and bromine within the reaction chamber. Such reaction facilitating means comprises a catalyst which may include a platinized carbon cloth. It is also contemplated that the catalyst include a temperature controller in thermal contact with the housing.

In yet another preferred embodiment, the device includes means for controlling flow of a gas through the housing. In one embodiment, the flow control means comprises positioning of the catalyst in an arrayed spiral configuration within the reaction chamber. The spirals can be separated by spacing means so as to facilitate the flow of a gas therethrough.

In a preferred embodiment of the invention, the flow control means comprises at least a portion of the reaction chamber being constructed from a mesh material.

In another preferred embodiment of the invention, the recombinator device includes means for controlling delivery of bromine into the reaction chamber. In such a preferred embodiment, the delivery control means comprises a capillary operatively associated with the bromine receiving means. Preferably, the capillary is sized to deliver one to two drops of aqueous bromine per minute.

In yet another preferred embodiment, the housing further includes an excess aqueous bromine pool region adjacent the hydrobromic acid distribution means.

The present invention is also directed to a zinc-bromine battery system comprising a zinc-bromine battery having a flowing electrolyte and a recombinator device of the type previously described.

The present invention is further directed to a method for re-acidifying an electrolyte in a flowing electrolyte zinc-bromine battery. The method comprises the steps of: a) introducing an electrolyte stream at least partially comprising aqueous bromine and hydrogen into a reaction chamber; b) reacting the bromine with the hydrogen to create a reaction product, and c) reintegrating the reaction product with at least one of an electrolyte stream or an electrolyte reservoir of the zinc-bromine battery for re-acidification of same.

In a preferred embodiment of the method, the step of introducing further includes the step of controlling the rate of bromine and hydrogen introduced into the reaction chamber. Such a step further includes the step of allowing one to two drops of the hydrogen and bromine electrolyte stream per minute.

In another preferred embodiment, the method further includes the step of regulating the temperature of the housing, and, in turn, the temperature within the reaction chamber. In such an embodiment, the step of regulating the temperature further includes the steps of pre-heating the housing; and maintaining the temperature of the housing. The preferable temperature range is between approximately 100 degrees Celsius and approximately 120 degrees Celsius.

In still another preferred embodiment, the step of reintegrating the reaction product further includes the step of removing the reaction product and excess reactant through an output stream.

In yet another preferred embodiment, the step of reacting the aqueous bromine and hydrogen includes the step of associating same with a catalyst.

DESCRIPTION OF THE DRAWINGS

Reference will now be made to the following drawings wherein:

FIG. 1 of the drawings is a schematic representation of the recombinator device of the present invention; and FIG. 2 of the drawings is a schematic representation of the recombinator device of FIG. 1 in its intended operational environment.

DETAILED DESCRIPTION OF THE INVENTION

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

The present invention comprises a recombinator device for use with a zinc-bromone battery system, and a method for re-acidifying an electrolyte stream in the zinc-bromone battery system. The device and method provide a novel, simple, and continuous means for prolonging the uninterrupted operation of a zinc-bromine battery system, while reducing unwanted byproducts of the system reactions.

Specifically, and as shown in FIG. 1 of the drawings, recombinator device 10 comprises housing 15, temperature controller 20, inlet stream coupling 25, and outlet stream coupling 30. Recombinator device 10 is shown in FIG. 1 as having a substantially cylindrical shape. Although the use of a cylindrical shape is depicted, it will be understood that a number of other shapes are likewise contemplated for use, depending on the desired application. Preferably, the shape of the housing is optimized to minimize total system volume while maximizing the surface area within housing 15 for the system reaction.

Housing 15 includes catalyst 35, center channel 40, top side 45, bottom side 50, and lateral side 55. As can be seen, top side 45, bottom side 50, and lateral side 55 form a complete enclosure, or inner chamber 60.

Catalyst 35 is shown in FIG. 1 as a series of parallel lines surrounding center channel 40. The parallel lines in FIG. 1 represent the preferred configuration of catalyst 35 as a spiral, centered on center channel 40 and radiating outwards. Catalyst 35 is preferably made from platinized carbon cloth, with an area of approximately 400 cm$^2$, and an active surface area of greater than 1200 m$^2$/g. Although the total area and surface area given are the preferred parameters of catalyst 35, any number of configurations or platinum loadings are possible. Importantly, however, catalyst 35 should allow for the free movement of gaseous hydrogen. In the preferred embodiment, such free movement is facilitated through the use of a cloth for the catalyst. In order to additionally facilitate the movement of hydrogen, it is preferable to maintain the spacing between the spirals of catalyst 35 through the use of spacers 65.

Catalyst 35, in its preferred form, is centered on center channel 40, additionally depicted in FIG. 1. Center channel 40 provides a fluidic connection between inlet stream coupling 25 and outlet stream coupling 30, as well as providing structure upon which catalyst is attached. As with catalyst 35, center channel 40 should likewise allow for the free movement of gaseous hydrogen within housing 15. Additionally, center channel 40 provides a surface for aqueous bromine to flow down, while increasing the exposure time of that bromine to the temperature environment within housing 15.

Temperature controller 20 is generally associated with housing 15, and is preferably associated with at least a portion of lateral side 55 of housing 15. Although an external placement of temperature controller 20 is depicted in FIG. 1, it is additionally contemplated that other placements are possible, as long as temperature controller 20 is either directly or indirectly in thermal contact with housing 15.

Inlet stream coupling 25 is shown in FIG. 1 as being associated with top side 45 of housing 15 in such a way as to provide access to inner chamber 60. Inlet stream coupling 25 is used to introduce aqueous bromine electrolyte and hydrogen gas into inner chamber 60. In order to regulate the introduction of bromine electrolyte, inlet stream coupling 25 additionally comprises capillary 70 associated therewith. Capillary 70 may be a variety of diameters or lengths, with each diameter or length corresponding to a different bromine electrolyte flow rate. Preferably, the diameter and length of capillary 70 are configured to allow for a flow rate of one to two drops of bromine electrolyte per minute. Hydrogen gas is introduced into inner chamber 60 simultaneously with bromine electrolyte.

As bromine electrolyte is introduced into inner chamber 60, the temperature environment created by temperature controller 20 vaporizes at least a portion of the aqueous bromine.

Outlet stream coupling 30 similarly provides access to inner chamber 60, as shown in FIG. 1, and is associated with bottom side 50 of housing 15. Outlet stream coupling 30 carries excess bromine electrolyte as well as absorbed hydrobromic acid out of inner chamber 60. However, in order to facilitate complete reaction of hydrogen and bromine, outlet stream coupling 30 additionally comprises pool reservoir 75. Pool reservoir 75, formed by the elongation of outlet stream 30, creates a reservoir for excess bromine electrolyte in inner chamber 60, allowing for extended access to the temperature environment within inner chamber 60.

Recombinator device 10 is shown in FIG. 2 in its intended environment, and, more particularly, in operative association with zinc-bromine battery system 200. Zinc-bromine battery system 200 is shown schematically as comprising supply conduit 110, recovery conduit 120, positive loop 210, negative loop 220, bromine reservoir 230 (which acts as a source for both aqueous bromine and gaseous hydrogen for recombinator device 10) and battery stack and electrolyte reservoir (neither of which are shown).

Supply conduit 110 is shown in FIG. 2 as comprising first end 115, second end 125, and pump 135. Supply conduit 110 provides a fluidic connection between bromine reservoir 230 at first end 115 and top side 45 of recombinator device 10 at inlet stream coupling 25. Pump 135 is associated with supply conduit 110 so as to provide for the fluidic movement of aqueous bromine and hydrogen from bromine reservoir 230 to recombinator device 10.

Recovery conduit 120, similarly, is shown in FIG. 2. as comprising first end 145. As can be seen, first end 145 of the recovery conduit is operatively associated with bottom side 50 of recombinator device 10 at outlet stream coupling 30, and with positive loop 210 at second end 155. As will be explained in greater detail, recovery conduit 120 carries re-acidified aqueous bromine stream from inner chamber 60, of recombinator device 10, to positive loop 210.

Again, keeping in mind that the present drawings merely disclose one of many possible recombinator device and zinc-bromine battery configurations, further explanation relative to the method for fabricating the battery and associated configuration will now be described—with respect to the use of a recombinator device in operative association as part of a zinc-bromine battery system.

Specifically, and in operation, positive loop 210 and negative loop 220 of the zinc-bromine battery, while in continuous operation, create hydrogen through electrolysis. This hydrogen is carried along through both positive loop 210 and negative loop 220 along with the flow of the electrolyte. Additionally, the reactions within the cell stacks of zinc-bromine battery 200 create a second liquid phase within positive loop 210 of aqueous bromine. The aqueous bromine is then collected in bromine reservoir 230. Bromine reservoir 230 therefore contains both aqueous bromine and gaseous hydrogen.

Recombinator device 10 is brought to a preferred temperature from ambient temperature by temperature controller 20. The temperature controller can be of a conventional design, or, easily configured by those having ordinary skill in the art. The preferred temperature of inner chamber 60 of the recombinator device is preferably between 100 degrees Celsius and 120 degrees Celsius. Temperatures above 100 degrees Celsius ensure that catalyst 35 within the recombinator device remains dry throughout the operation process. Temperature increases of 10 degrees double catalytic activity, but require additional energy to maintain the temperature. Therefore, the preferred temperature of operation reflects a balance between the two system expenditures. It is additionally contemplated, however, that the device may operate at higher or lower temperatures.

Once recombinator device 10 reaches its preferred temperature, pump 135 operates to introduce the fluid contained in bromine reservoir 230 into inner chamber 60 of housing 15 through capillary 70. Fluid in bromine reservoir 230, as noted above, contains both aqueous bromine and gaseous hydrogen. Capillary 70 regulates the flow of fluid into inner chamber 60. Preferably, capillary 70 is of sufficient diameter to allow 1–2 drops per minute of aqueous bromine to be introduced into inner chamber 60. At the preferred rate of delivery, and at preferred temperature, bromine is essentially vaporized upon introduction into inner chamber 60. Additionally, center channel 40, of the recombinator device, connects inlet stream coupling 25 and outlet stream coupling 30, providing surface area for excess aqueous bromine to flow down. The flow of excess aqueous bromine down center channel 40 ensures maximum exposure of aqueous bromine to temperature conditions within inner chamber 60, increasing the amount of vaporized bromine. Any excess aqueous bromine is collected at bottom side 50 of housing 15 in pool 75. Pool 75 provides additional exposure of aqueous bromine to temperature conditions within inner chamber 60.

Although the reaction of hydrogen and bromine will proceed at the preferred temperature, it is also preferable to include catalyst 35 in inner chamber 60 of recombinator device 10 to further promote reaction. At the surface of catalyst 35, the reaction rate is high enough that a concentration gradient is formed in hydrogen. As the hydrogen bromide reaction removes hydrogen from the system, the concentration gradient drives additional hydrogen into inner chamber 60 and towards catalyst 35, supplying the driving force for introducing additional hydrogen into inner chamber 60 from the cell stacks of zinc-bromine battery 200. Catalyst 35 therefore provides both a means for facilitating the hydrogen bromide reaction, as well as a driving force for the introduction of hydrogen into inner chamber 60.

Gaseous hydrogen and bromine react to form gaseous hydrogen bromide. The hydrogen bromide leaves inner chamber 60 and housing 15 of the recombinator device through absorption into the overflow aqueous bromine located in pool 75, or through migration into zinc-bromine battery 200 through outlet stream coupling 30. Once in outlet stream coupling 30, hydrogen bromide is carried through recovery conduit 120 back into positive loop 210, re-acidifying the electrolyte stream.

What is claimed is:

1. A recombinator device for the re-acidification of an electrolyte stream in flowing electrolyte zinc-bromine battery, comprising:

a housing operatively associated with a zinc-bromine battery;

means for receiving hydrogen from the zinc-bromine battery;

means for receiving bromine from the zinc-bromine battery;

means for reacting the hydrogen and bromine together so as to form hydrobromic acid, wherein the reaction means comprises means for facilitating the reaction of hydrogen and bromine within the reaction chamber, the reaction facilitating means comprising means for controlling temperature within the reaction chamber; and means for distributing the hydrobromic acid into at least one of an electrolyte stream or electrolyte reservoir of the zinc-bromine battery for re-acidification of same.

2. The device according to claim 1 wherein the hydrogen receiving means and the bromine receiving means comprise an inlet stream coupling operatively attached to the zinc-bromine battery.

3. The device according to claim 1 wherein the hydrobromic distribution means comprises an outlet stream coupling operatively attached to at least one of an electrolyte stream or electrolyte reservoir of the zinc-bromine battery.

4. The device according to claim 1 wherein the reaction facilitating means comprises a catalyst.

5. The device according to claim 4 wherein the catalyst comprises a platinized carbon cloth.

6. The device according to claim 1 wherein the temperature controlling means is in thermnal contact with at least a portion of the housing.

7. The device according to claim 1 further including means for controlling flow of a gas through the housing.

8. The device according to claim 1 further including means for controlling delivery of bromine into the reaction chamber.

9. The device according to claim 1 wherein the housing further includes an excess aqueous bromine pool region adjacent the hydrobromic acid distribution means.

10. A recombinator device for the re-acidification of an electrolyte stream in a flowing electrolyte zinc-bromine battery, comprising:

a housing operatively associated with a zinc-bromine battery;

means for receiving hydrogen from the zinc-bromine battery;

means for receiving bromine from the zinc-bromine battery;

means for reacting the hydrogen and bromine together so as to form hydrobromic acid, the reaction means comprising a catalyst;

means for controlling flow of a gas through the housing, wherein the flow controlling means comprises positioning of the catalyst in an arrayed spiral configuration within the reaction chamber; and means for distributing the hydrobromic acid into at least one of an electrolyte stream or electrolyte reservoir of the zinc-bromine battery for re-acidification of same.

11. The device according to claim 10 further comprising spacing means positioned between the spirals of the catalyst for facilitating the flow of a gas therethrough.

12. The device according to claim 10 wherein the flow control means comprises at least a portion of the reaction chamber being constructed from a mesh material.

13. A recombinator device for the re-acidification of an electrolyte stream in a flowing electrolyte zinc-bromine battery, comprising:

a housing operatively associated with a zinc-bromine battery;

means for receiving hydrogen from the zinc-bromine battery;

means for receiving bromine from the zinc-bromine battery;

means for controlling delivery of bromine into the reaction chamber, wherein the delivery control means comprises a capillary operatively associated with the bromine receiving means;

means for reacting the hydrogen and bromine together so as to form hydrobromic acid; and means for distributing the hydrobromic acid into at least one of an electrolyte stream or electrolyte reservoir of the zinc-bromine battery for re-acidification of same.

14. The device according to claim 13 wherein the capillary is sized to deliver one to two drops of aqueous bromine per minute.

15. A method for re-acidifying an electrolyte in a flowing electrolyte zinc-bromine battery, comprising the steps of:

introducing an electrolyte stream at least partially comprising aqueous bromine and hydrogen into a reaction chamber, wherein the step of introducing comprises the step of controlling the rate of bromine and hydrogen introduced into the reaction chamber by allowing one to two drops of hydrogen and bromine electrolyte stream per minute;

reacting the bromine with the hydrogen to create a reaction product; and reintegrating the reaction product with at least one of an electrolyte stream or an electrolyte reservoir of the zinc-bromine battery for re-acidification of same.

16. A method for re-acidifying an electrolyte in a flowing electrolyte zinc-bromine battery, comprising the steps of:

regulating the temperature of the housing, and, in turn, the temperature within the reaction chamber;

introducing an electrolyte stream at least partially comprising aqueous bromine and hydrogen into a reaction chamber;

reacting the bromine with the hydrogen to create a reaction product; and reintegrating the reaction product with at least one of an electrolyte stream or an electrolyte reservoir of the zinc-bromine battery for re-acidification of same.

17. The method according to claim 16, wherein the step of regulating the temperature further includes the steps of:

pre-heating the housing; and maintaining the temperature of the housing.

18. The method according to claim 17, wherein:

the step of pre-heating comprises the step of adjusting the temperature of the housing to between approximately 100 degrees Celsius and approximately 120 degrees Celsius; and the step of maintaining the temperature of the housing comprises the step of maintaining the temperature between approximately 100 degrees Celsius and approximately 120 degrees Celsius.

19. The method according to claim 16 wherein the step of reintegrating the reaction product further includes the step of removing the reaction product and excess reactant through an output stream.

20. The method according to claim 16 wherein the step of reacting the aqueous bromine and hydrogen includes the step of associating same with a catalyst.

21. The method according to claim 20 wherein the catalyst comprises at least one of platinized carbon and heat.

* * * * *